Patented Dec. 23, 1952

2,622,661

UNITED STATES PATENT OFFICE 2,622,661

SPRING WIRE SEAT FILLER

George M. Markle, Grand Rapids, Mich.

Application December 9, 1950, Serial No. 200,023

2 Claims. (Cl. 155—179)

The present invention relates to spring wire seat fillers and more particularly to fillers such as are intended to be covered by upholstery of a seat or cushion.

The primary objects of the instant invention are to provide a filler of the general character above indicated which is so constructed that the seat or cushion will not sag after a period of use; to provide such a filler which is simple in construction; to provide such a filler which is highly efficient in effecting its intended purpose; and, to provide such a filler which is economical in manufacture.

Illustrative embodiments of the invention are shown in the accompanying drawing, wherein.

Figures 1, 2:
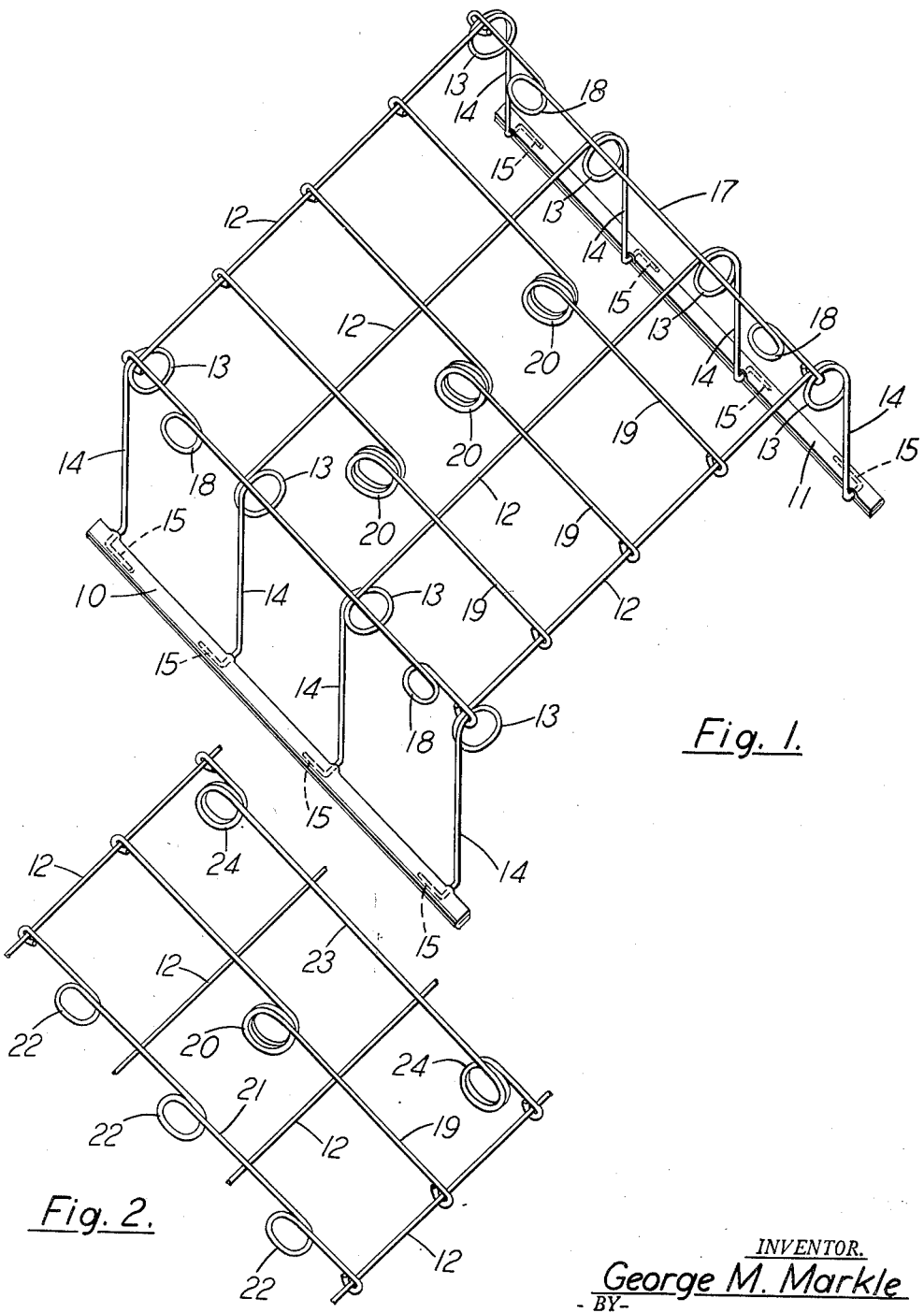
Figure 1 is a perspective view of one form thereof.
Figure 2 is a perspective view showing at its opposite sides two other types of seat or cushion supporting stringers, the middle stringer there illustrated being of the same character as that shown by the three stringers in Figure 1.

Referring then to the drawing and firstly to Figure 1, the filler there shown comprises a pair of spaced apart forward and rearward struts 10, 11 respectively and U-shaped in cross-section, the closed lengths of each member 10, 11 each facing outwardly.

A plurality of substantially equidistantly spaced inverted U-shaped spring wire stringers 12 are each provided with a depending loop 13 at the respective opposite ends of their medial portion and the several legs 14 of each stringer 12 are provided with a laterally turned foot 15 seated and secured within the length of a companion U-shaped strut 10, 11.

End spring wire stringers 16, 17 each provided with a depending loop 18 adjacent its opposite ends are secured at their several opposite ends to an outer stringer 12 substantially above the forward and rearward struts 10, 11 respectively.

A plurality of substantially equidistantly spaced spring wire stringer 19, each provided with a medially disposed double depending loop 20 are positioned intermediate the end stringers 16, 17 and are each secured at their opposite ends to the two outer U-shaped stringers 12, said stringers 19 resting upon the several intermediate stringers 12.

The depending loops 13, 18 and 20 of the spring wire filler provide resilience to the upholstered seat or cushion yet nevertheless prevent sagging after a period of use.

Referring now to Figure 2, the spring wire stringer 21 is there shown as provided with substantially equidistantly spaced triple loops 22, each spacedly depending between the several U-shaped stringers 12 and the spring wire stringer 23 is shown as provided with a pair of depending double loops 24 adjacent its opposite ends and between an outer and inner stringer 12, the loops 22, 24 of such stringers 21, 23 respectively likewise providing for resilience to the filler yet preventing sagging of the seat or cushion over a period of time.

It will thus be seen that the filler of the instant invention is so constructed that the seat or cushion will not sag after a period of use, that it is structurally simple, is highly efficient in effecting its intended purpose, and is reasonably economical in manufacture.

While but several specific embodiments of the invention have been herein shown and described, it will be understood that certain details of the constructions shown may be altered or omitted without departing from the spirit of the invention as the same is defined in the following claims.

I claim:

1. A spring wire seat cushion filler comprising a pair of spaced apart forward and rearward struts; a plurality of spaced inverted U-shaped spring wire stringers secured at their opposite ends to said struts respectively, each of said stringers having a depending loop adjacent the end of its medial portion; end spring wire stringers, each provided with a depending loop adjacent its opposite end and secured at its respective opposite ends to an outer end of an inverted U-shaped stringer substantially above a forward and rearward strut; and a plurality of spring wire stringers interposed between the end stringers each provided with a loop depending between the several inverted U-shaped stringers.

2. A spring wire seat cushion filler comprising a pair of spaced apart forward and rearward struts; a plurality of spaced inverted U-shaped spring wire stringers secured at their opposite ends to said strut respectively, each of said stringers having a depending loop adjacent the end of its medial portion; and a plurality of spaced apart transversely disposed spring wire stringers, each provided with a depending loop intermediate its ends and secured at its opposite ends to an outer inverted U-shaped stringer.

GEORGE M. MARKLE.

REFERENCES CITED

The following references are of record in the file of this patent:

UNITED STATES PATENTS

| Number | Name | Date |
|---|---|---|
| 474,536 | Staples | May 10, 1892 |
| 509,225 | Judson et al. | Nov. 21, 1893 |
| 514,002 | Hanrahan | Feb. 6, 1894 |
| 1,139,892 | Miller et al. | May 18, 1915 |
| 1,599,365 | King et al. | Sept. 7, 1926 |

FOREIGN PATENTS

| Number | Country | Date |
|---|---|---|
| 570,050 | Great Britain | June 20, 1945 |